(12) United States Patent
Koppers et al.

(10) Patent No.: US 8,068,400 B2
(45) Date of Patent: *Nov. 29, 2011

(54) METHOD OF RECORDING INFORMATION ON A MULTILAYER RECORD CARRIER, AND DEVICE FOR RECORDING ON A DUAL LAYER RECORD CARRIER

(75) Inventors: Wilhelmus Robert Koppers, Nieuwegein (NL); Hubert Cecile Francois Martens, Eindhoven (NL); Pierre Hermanus Woerlee, Valkenswaard (NL); Johannes Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,781

(22) Filed: Oct. 13, 2009

(65) Prior Publication Data

US 2010/0067358 A1  Mar. 18, 2010

Related U.S. Application Data

(63) Continuation of application No. 10/562,895, filed on Dec. 29, 2005, now Pat. No. 7,623,432.

(30) Foreign Application Priority Data

Jul. 1, 2003 (EP) .................................. 03077059
Aug. 20, 2003 (EP) .................................. 03102608

(51) Int. Cl.
*G11B 7/20* (2006.01)

(52) U.S. Cl. .................... 369/94; 369/13.39; 369/13.38; 369/13.4; 369/280

(58) Field of Classification Search ............... 369/13.18, 369/13.39, 13.4, 280

See application file for complete search history.

(56) References Cited

U.S. PATENT DOCUMENTS

| | | | |
|---|---|---|---|
| 5,729,525 A | 3/1998 | Ishida et al. | |
| 6,125,101 A | 9/2000 | Kikukawa et al. | |
| 6,370,091 B1 | 4/2002 | Kuroda | |
| 6,434,095 B1 | 8/2002 | Nishiuchi et al. | |
| 7,016,289 B2 | 3/2006 | Sasaki | |
| 7,184,377 B2 | 2/2007 | Ito et al. | |
| 7,623,432 B2 * | 11/2009 | Koppers et al. | 369/94 |
| 2001/0014070 A1 * | 8/2001 | Ando et al. | 369/59.25 |
| 2002/0010811 A1 | 1/2002 | Arndt et al. | |
| 2003/0227846 A1 * | 12/2003 | Lee et al. | 369/53.21 |

FOREIGN PATENT DOCUMENTS

| | | |
|---|---|---|
| EP | 1204106 A2 | 5/2002 |
| JP | 2000099946 | 4/2000 |
| JP | 2002358649 | 12/2002 |
| JP | 2003045072 | 2/2003 |
| JP | 2003157587 | 5/2003 |
| JP | 2004310972 A | 11/2004 |
| KR | 199911995 | 2/1999 |
| WO | WO 02086873 A1 * | 10/2002 |
| WO | 03060895 A1 | 7/2003 |

* cited by examiner

*Primary Examiner* — Lixi C Simpson

(57) ABSTRACT

Recordable DVD+R and DVD+R/W optical discs with two (or more) information layers are developed to double the data storage capacity and video recording time. A method and device are proposed to make dual layer DVD disc recordings compliant with the dual layer DVD-ROM standard Recording the data in a DVD-ROM compliant way on the dual layer DVD+R or DVD+R/W disc is obtained by shifting the middle zone area towards the inner radius of a disc in such a way that the data zones of both layers are filled up with data.

8 Claims, 4 Drawing Sheets

METHOD OF RECORDING INFORMATION ON A MULTILAYER RECORD CARRIER, AND DEVICE FOR RECORDING ON A DUAL LAYER RECORD CARRIER

This is a continuation of U.S. Ser. No. 10/562,895, filed Dec. 29, 2005, now U.S. Pat. No. 7,623,432 and is incorporated by reference herein.

The invention relates to a method of recording information on a multi-layer record carrier. In particular, the invention relates to a method of recording information on a dual layer DVD+R or DVD+R/W disc, such that it becomes compliant with the dual layer DVD-ROM Standard.

Information is stored on optical record carriers according to specific rules and layouts, generally referred to as Formats, which are described in documents generally referred to as a Standards.

Recordable (both write-once and rewritable) optical storage for video and data applications is a rapidly growing market. For DVD+R discs, comprising a single information layer, the storage capacity is 4.7 Gbyte. This is a limited amount of storage for video recording and data applications. With MPEG2 compression it is possible to record one hour of high quality digital video and two hours of standard quality. More data storage capacity is desirable. An option is to use optical discs with multiple information layers. Such discs are already available for DVD-ROM.

Figure 1:
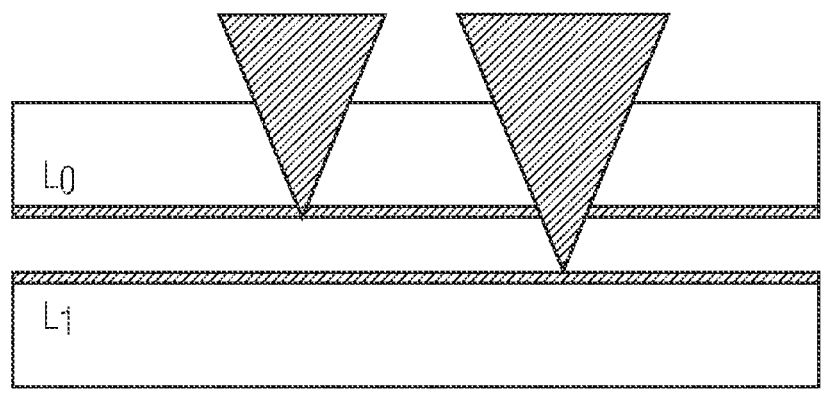

Recordable optical discs with two information layers are developed to double the data storage capacity and video recording time. Such a dual layer disc is schematically shown in FIG. 1. The dual layer disc comprises two information layers, generally referred to as the L0 and L1 layers. The L0 layer is the information layer located closest to the side of a disc where a radiation beam, such as a laser beam, used for reading and/or recording the information enters the disc.

A dual layer DVD+R disc has recently been suggested by Philips and is disclosed in International Patent Application WO 03/060895-A1. Such a disc is in principle compatible with the dual layer DVD-ROM Standard. As an example, the reflection levels of both layers are >18% which adheres to the DVD-ROM Standard (Standard ECMA—267, 120 mm DVD—Read-only disc).

It is, however, a problem that the information recorded on a dual layer recordable DVD disc cannot always be reproduced on a DVD-ROM player without errors. This, so-called compatibility issue, is especially a problem since a large installed base of DVD-ROM players is already available all around the world.

Figure 2A:
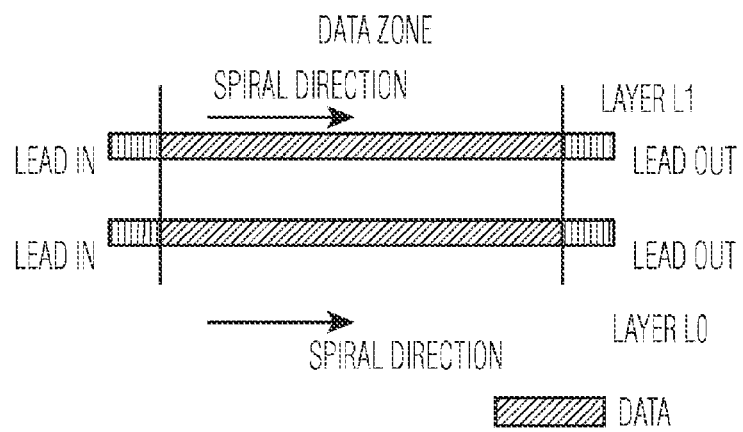
Figure 2B:
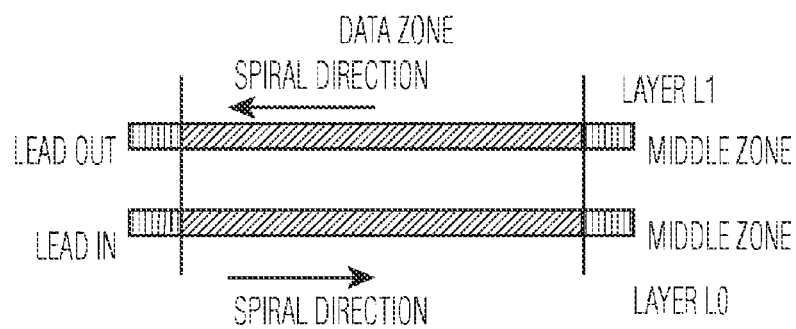
Figure 3A:
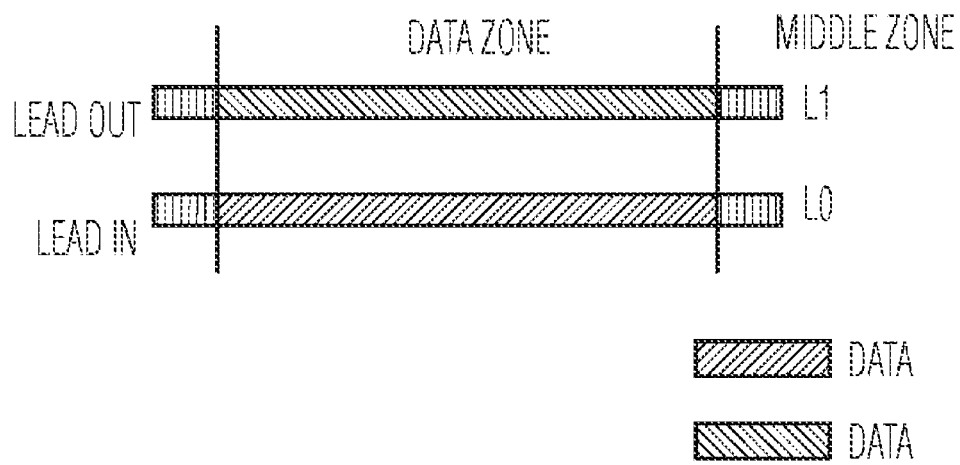
Figure 3B:
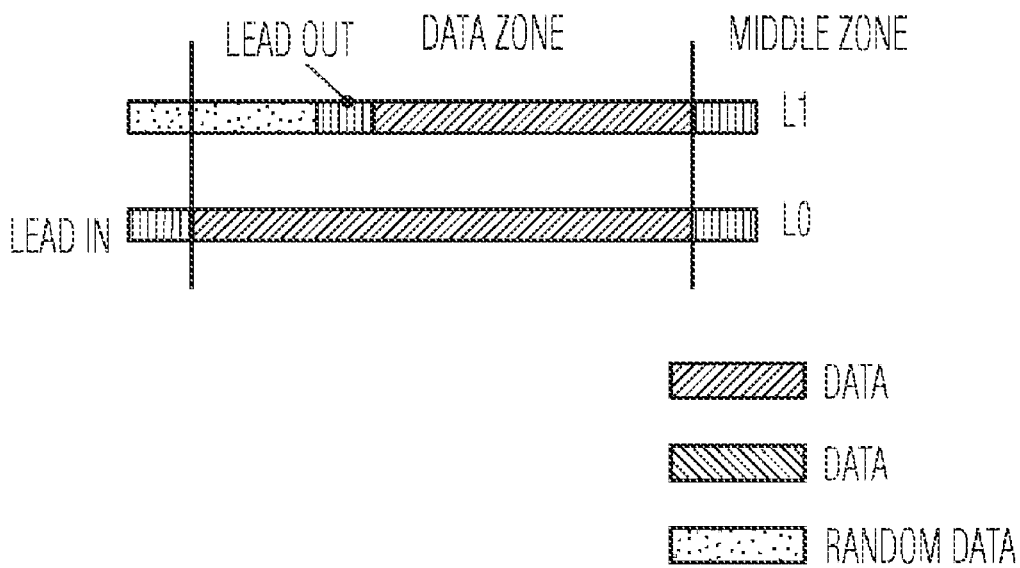
Figure 4:
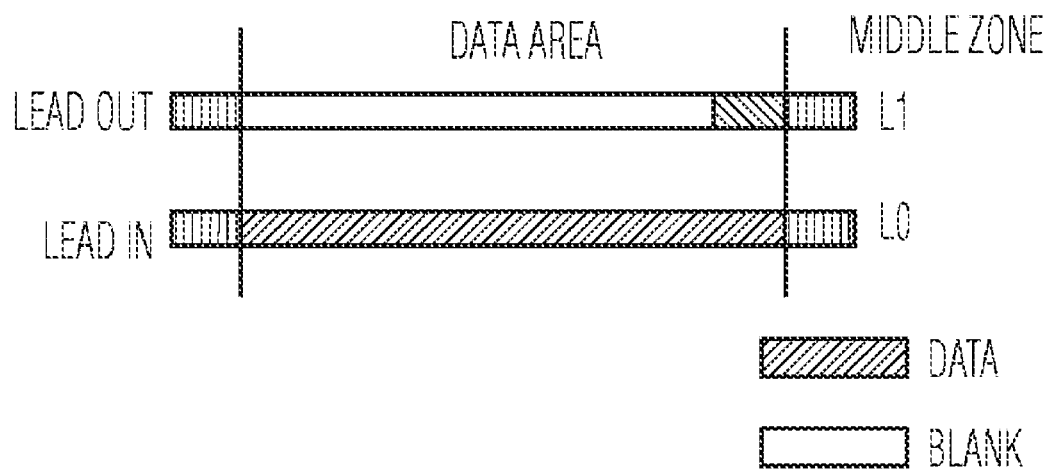
Figure 5:
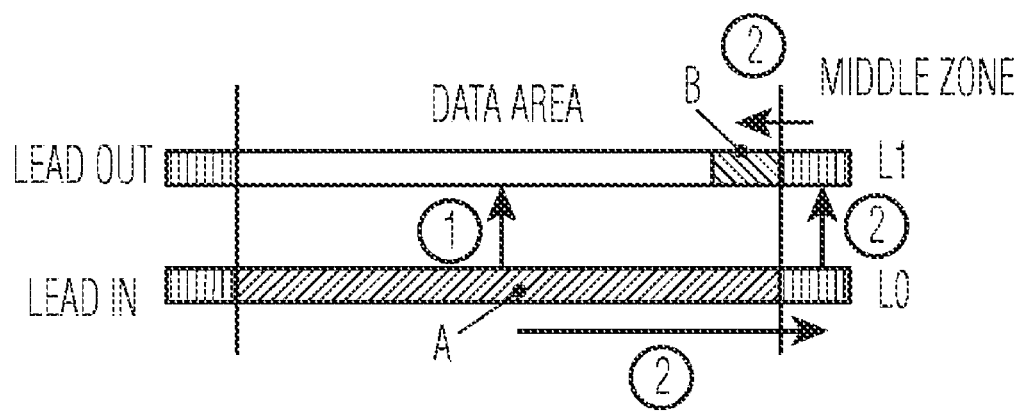
Figure 6:
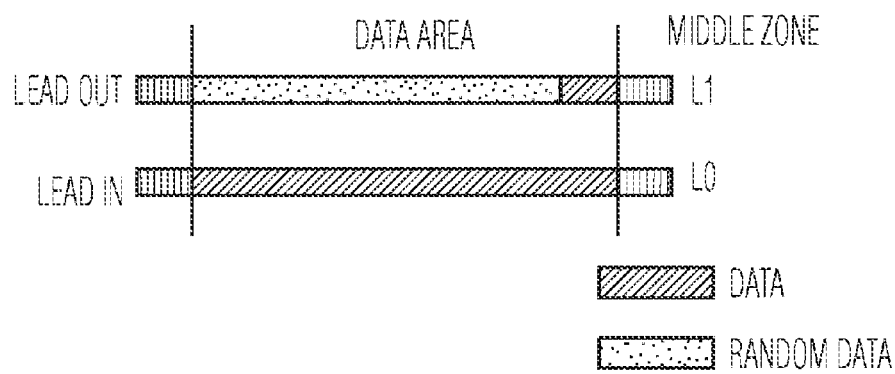
Figure 7:
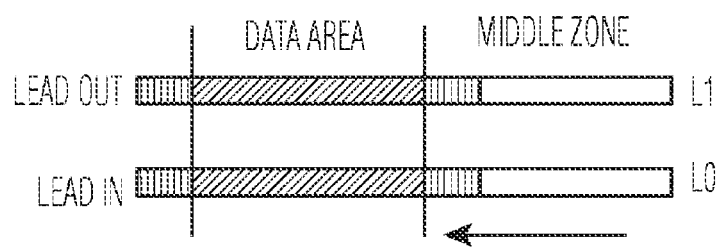
Figure 8:
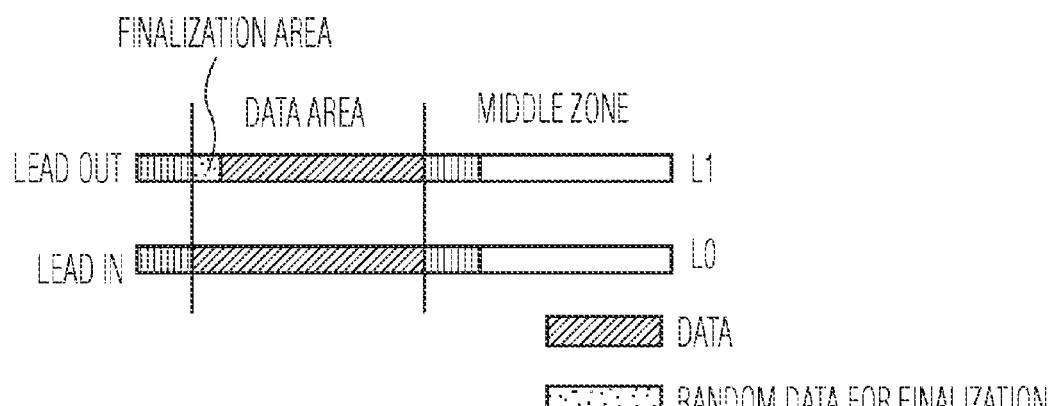

FIG. 1 shows a dual layer disc.
FIG. 2A shows a Parallel Track path, PTP.
FIG. 2B shows an Opposite Track path, OTP.
FIG. 3A shows a fully written OTP type dual layer DVD-ROM disssc with the full amount of 8.5 GByte of data stored on the disc.
FIG. 3B shows a fully written OTP type dual layer DVD-ROM disc with less than the full amount of 8.5 GByte of data stored on the disc.
FIG. 4 shows the disc can in principle be closed when the data zone of layer L1 (or layers L0 and L1) is not completely written.
FIG. 5 shows two possible paths (path 1 and path 2) of a DVD player during play back jumping from layer L0 to layer L1.
FIG. 6 shows finalizing the disc by writing dummy data, such as a random data pattern or an all-zero data pattern, on the remaining blank data area.
FIG. 7 shows the data is recorded while shifting the middle zone area toward the inner radius of the disc in such a way that the whole data area is filled up with data.
FIG. 8 shows a recording on a dual layer DVD+R disc in such a way that the finalization area is minimized.

It is an object of the present invention to provide a method of recording a multi layer record carrier, and especially a dual layer recordable DVD disc, in such a way that it can be reproduced in DVD-ROM players without errors.

According to the dual layer DVD-ROM Standard two different disc types are described: Opposite Track Path, OTP, discs (shown in FIG. 2B), and Parallel Track Path, PTP, discs (shown in FIG. 2A). FIG. 3A shows a fully written OTP type dual layer DVD-ROM disc with the full amount of 8.5 GByte of data stored on the disc, while FIG. 3B shows a fully written OTP type dual layer DVD-ROM disc with less than the full amount of 8.5 GByte of data stored on the disc.

After finalization a dual layer DVD+R disc should comply with the dual layer DVD-ROM Standard, when it is to be played back on a DVD player (or DVD recorder). In this DVD-ROM Standard (Standard ECMA—267, 120 mm DVD—Read-only disc) it is demanded that the whole data zone after the lead out is written with data (data patterns) in case of an OTP type disc. In case of an OTP like dual layer DVD+R disc, the disc can in principle be closed when the data zone of layer L1 (or layers L0 and L1) is not completely written (see FIG. 4). However, such a recorded disc is not DVD-ROM compliant, because the whole data area is not filled with data, and problems can occur when it is inserted in a DVD-player (or a DVD-recorder) and played-back.

FIG. 5 shows two possible paths (path 1 and path 2) of a DVD player during play back jumping from layer L0 to layer L1. The two possible search paths (path 1 and path 2) are indicated going from position A on L0 to position B on L1. Path 1 is the shortest and most likely option to be selected. However, during such a layer jump, or focusing routine, the read-out spot jumps to the blank data area. According to the DVD-ROM standard, data should be present here. Therefore, a DVD-ROM player will become confused and, most likely, reject the disc. This effect is confirmed by recent measurements.

An option to solve this problem and to make a dual layer DVR+R or DVD+R/W disc DVD-ROM compliant is to finalize the disc by writing dummy data, such as a random data pattern or an all-zero data pattern, on the remaining blank data area, as is shown in FIG. 6. However, this may take a considerable amount of time (up to over one hour), which is unacceptable for consumer applications.

The recording method and recording device according to the present invention allow for making dual layer DVD+R or DVD+R/W disc recordings compliant with the dual layer DVD-ROM OTP standard without significantly increasing the recording time (including the finalization time), thereby increasing the ease of use and guaranteeing playback of the recorded disc on any DVD players now in the market.

According to the invention, writing the data (for example a video-stream) in a DVD-ROM compliant way on the dual layer DVD+R or DVD+R/W disc is done by shifting the middle zone area towards the inner radius in such a way that the data zones of both information layers are filled up with data. The data is recorded while shifting the middle zone area towards the inner radius of the disc in such a way that the whole data area is filled up with data, as is shown in FIG. 7.

Besides that a DVD-ROM compliant disc is produced, this method has the advantages that no time-consuming finalization procedure has to be performed because no dummy date needs to be recorded.

In an embodiment of the invention, it is proposed to minimize the finalization area. This is especially advantageous when it appears difficult to exactly tune the shift of the middle zone area. FIG. 8 shows a recording on a dual layer DVD+R disc in such as a way that the finalization area is minimized The size of the finalization area should be significantly smaller that the size of the data area (for example smaller than 5% of the data area).

In a further embodiment the data content is evenly distributed over both information layers L0 and L1. When the size of the data content is known (for example in case of recording from hard disc to dual layer DVD+R or DVD+R/W disc, or during disc-to -disc recording), this content can be evenly distributed over both information layers. For example, when 6 GByte of data has to be copied from a hard disc to a dual layer DVD+R disc. Instead of writing 4.7 GByte on layer L0 and 1.3 GByte on layer L1 (as shown in FIG. 4 and FIG. 6), it is proposed to write 3 GByte on layer L0 and 3 GByte on layer L1 by shifting the middle zone to the inner radius. Now, the data is written in such a way that a long finalization area is avoided (or made very small when still necessary).

In a further embodiment an estimate of the disc space required for storing the data is made prior to the recording itself. This is especially useful when the recording time is known, for example when recording a video or data stream directly to a dual layer DVD+R or DVD+R/W. When the recording time is known (for example from a TV guide or from a time programmed in a video-recorder) we can beforehand make an estimate of the disc space that is needed. For example, a recording is programmed for 3 hours. Instead of recording 2 hours on layer L0 and 1 hour on layer L1, we propose to record 1.5 hours on layer L0 and 1.5 hours on layer L1. Preferably, some recoding space is reserved on layer L1 to anticipate for possible variable bit rates during compression of the stream.

It is noted that although the invention is explained with reference to a dual layer record carrier, it should be obvious to a man skilled in the art that the invention can be applied to multi layer record carriers having more than 2 information layers as well, without departing from the essence of the invention.

The invention claimed is:

1. A method of recording information on a recordable multi-layer record carrier, comprising the acts of:
   recording a first area of information on a first layer of the record carrier,
   recording a second area of information on a second layer of the record carrier that is different than the first layer, and
   shifting middle zone areas of at least the first and second layers towards an inner radius of the record carrier such that inner radius data areas of the first and second layers are filled with a portion of the information if the record carrier is recorded with less than a full capacity of the record carrier,
   wherein, the first area and the second area are substantially equal in size and superjacent.

2. The method of claim 1 further comprising the acts of:
   recording a third area of information on the first layer of the record carrier,
   recording a forth area of information on a second layer of the record carrier, and
   wherein the third area is substantially free of overlap of the second area and the fourth area is substantially free of overlap of the first area, and
   wherein, the third area and the fourth area are substantially equal in size and superjacent.

3. The method of claim 1, wherein the first area comprises a sub-area comprising dummy data, said sub-area having a size significantly smaller than the size of the first area.

4. The method of claim 1, wherein the information is recorded in equal sized subjacent areas evenly distributed over all layers of the multi-layer record carrier.

5. A recording device for recording information on a recordable multi-layer record carrier, the device comprising:
   means for receiving information for recording on the record carrier,
   means for recording information on any of the multiple layers of the record carrier,
   control means for controlling the writing of information, such that, a first area containing information on the first information layer and a second area containing information on the different second information layer are of substantial equal size, and such that, the first and the second area's are superjacent to each other, wherein the control means shifts middle zone areas of at least the first and second layers towards an inner radius of the record carrier such that inner radius data areas of the first and second layers are filled with a portion of the information if the record carrier is recorded with less than a full capacity of the record carrier.

6. The recording device of claim 5 wherein the control means controls the writing of information, such that, a third area containing information on the first information layer and a fourth area containing information on the second information layer are of substantial equal size, and such that, the third and the fourth area's are superjacent to each other, and such that the third area does not substantially overlap the second area and the fourth area does not substantially overlap the first area.

7. The recording device of claim 5, wherein the control means controls the writing of information, such that, the first area comprises a sub-area comprising dummy data, said sub-area having a size significantly smaller than the size of the first area.

8. The recording device of claim 5, wherein the control means controls the writing of information, such that, the information is recorded in equal sized subjacent areas evenly distributed over all layers of the multi-layer record carrier.

* * * * *